United States Patent Office 2,716,637
Patented Aug. 30, 1955

2,716,637

SIMULATED SNOW COATING

Albert L. Bunting, Dearborn, Mich., assignor to Continental Filling Corporation, Danville, Ill., a corporation of Illinois No Drawing. Application October 13, 1952,
Serial No. 314,565

5 Claims. (Cl. 260—23)

The present invention relates to a composition of matter which will produce a fine flaky coating simulating the appearance of snow on a surface.

More particularly, the present invention relates to the provision of a solution of a plastic resin in a volatile solvent which, upon exposure to the atmosphere, produces fine bubbles of plastic resin because of the rapid escape of the solvent from the solution.

It is well known in the art that if a plastic resin is dissolved in a solvent having a very low boiling point that as the solvent escapes bubbling and blistering of the resin will result. This phenomenon has been utilized heretofore in the production of simulated snow coatings for the decoration of Christmas trees or the like.

Such compositions usually consist of a plastic resin dissolved in a volatile solvent and enclosed in a pressure container. As the solution is sprayed from the container small globules of plastic resin are formed. These globules must retain sufficient solvent to give a tackiness to the simulated snow so that it will adhere to the surface upon which it is sprayed. However, the subsequent escape of this retained solvent produces an undesirable blistering effect which destroys the desired appearance of the decorative coating of simulated snow.

Such compositions also have been found to be difficult to remove from painted surfaces, floors, rugs, and household furnishings thereby preventing the ready general acceptance of such simulated snow for home use.

Also, the high resin content of previous simulated snow compositions has prevented the production of an inexpensive composition for quantity consumption.

It is accordingly one object of the present invention to provide a composition of matter which will produce a coating simulating snow upon exposure to the atmosphere wherein the resultant coating will not blister after it has been formed.

It is a further object of the present invention to produce such a composition which is relatively inexpensive and therefore available for quantity consumption.

Another object of the present invention is to provide a composition for the production of a coating simulating snow which coating is easily and readily removable with readily available household cleaners from painted surfaces, floors, rugs, and household furnishings.

Other objects of the present invention will appear in the following description and appended claims. It is to be understood that the phraseology or terminology employed in the following description is for the purpose of description and not of limitation.

The embodiment of the present invention comprises essentially ethyl cellulose or a plastic resin dissolved in a low boiling point solvent. The solution is made in a pressure container and the solvent serves as a propellant gas to spray the composition from the nozzle of the container.

The solvent is selected from any of the group of normally gaseous pressure liquefiable halogenated aliphatic hydrocarbons containing one or more fluorine atoms.

"Freons" and "Genetrons" are well-known commercially available solvent-propellants which may be used in the present compositions. "Freon" and "Genetron" are the trademarks for a group of halogenated aliphatic hydrocarbons containing one or more fluorine atoms and are well-known for use as propellants.

Any resin soluble in the selected solvent is suitable for use in the present composition. Among this class are polystyrene, polymethyl acrylate, butyl-methacrylate, and iso-butyl-methacrylate which are thermoplastic synthetic resins, and natural resins such for example as copals or the like. The resin used depends, of course, upon its solubility in the solvent selected. I have found it most economical and effective to keep the plastic content between approximately 5 to approximately 12% of the composition and preferably in the range of from approximately 7½% to approximately 10%.

As the solution is sprayed from the container small globular spheroids of plastic are formed by the escaping solvent. These spheroids retain a certain amount of solvent so that they have enough tackiness to adhere to the surface upon which they are sprayed. This retained solvent must subsequently evaporate rapidly in order to give the desired texture and appearance to the formed coating of simulated snow and to prevent stringing or cobwebbing between the spheroids which would destroy the flake-like appearance of snow. In order to keep the plastic surface open to allow such rapid evaporation of the solvent, I include in the original solution the desired amount of any desired free fatty acid.

Because of the objectionable odors of many of the fatty acids, I prefer to use stearic or palmitic acid both of which are commercially available and free of objectionable odor. I have found that the fatty acid content preferably is within the range of from approximately 10% to approximately 100% of the resin content. A formulation wherein the acid content is approximately 10% of the resin content gives an artificial snow which adheres very well to Christmas trees, windows and the like.

The inclusion of the fatty acid also reduces the necessary content of resin in the formulation thereby reducing the cost of the composition and making it available for quantity consumption.

I have found also that the inclusion of a fatty acid makes the resulting simulated snow coating easily removable from painted surfaces, floors, rugs, and other household furnishings. A mild alkali, such as ordinary household cleaners, will effectively loosen and remove the simulated snow formed by such a composition.

The fatty acid also serves as a solvent and carrier for perfumes which it may be desirable to include. Also the fatty acid will serve as a solvent and carrier for a dye if it is desired to have other than a white coating.

The following are specific examples of formulations which I have found to be satisfactory:

*Example I*

Stearic acid_____ Approx. 1.0% by weight.
Acryloid B-72____ Approx. 7.5% by weight.
Propellant gas____ Approx. 91.5% by weight.

*Example II*

Stearic acid_____ Approx. 2.5% to 5.0% by weight.
Acryloid B-72____ Approx. 5.0% to 7.5% by weight.
Propellant gas____ Approx. 90.0% by weight.

The acryloid B-72 specified in the foregoing examples is a product marketed by Rohm and Haas and is a copolymer of iso-propyl methacrylate and normal-propyl methacrylate.

The propellant gas specified is a mixture of or any one of the halogenated hydrocarbons having one or more fluorine atoms. The proportion of propellant such as the Freons is generally from about 83% to about 94% by weight of the self-spraying solution.

Having thus described my invention I claim:

1. A self-spraying pressurized artificial snow-forming composition consisting essentially of a solution, said solution comprising a minor proportion not exceeding about 12% of a thermoplastic material selected from the group consisting of polymerized methyl acrylate, alkyl methacrylate polymers, polystyrene, and ethyl cellulose, and a minor proportion not exceeding about 12% of a free fatty acid selected from the the group consisting of stearic acid and palmitic acid, said material and said acid being dissolved in a major proportion of a solvent-propellant consisting essentially of a pressure-liquefiable, normally gaseous, halogen-substituted aliphatic hydrocarbon containing at least one fluorine atom.

2. The composition of claim 1 wherein the solvent-propellant comprises about 83% to 94% by weight of the self-spraying solution.

3. The composition of claim 1 wherein the thermoplastic material is a butyl methacrylate polymer.

4. The composition of claim 1 wherein the polymer is an isobutyl methacrylate polymer.

5. The composition of claim 1 wherein the thermoplastic material is a copolymer of isopropyl methacrylate and normal propyl methacrylate.

References Cited in the file of this patent

UNITED STATES PATENTS

| | | |
|---|---|---|
| 2,515,250 | McIntire | July 18, 1950 |
| 2,524,590 | Boe | Oct. 3, 1950 |
| 2,617,780 | Lutz | Nov. 11, 1952 |